United States Patent
Shimoyama (10) Patent No.: US 11,514,606 B2
(45) Date of Patent: Nov. 29, 2022

(54) INFORMATION PROCESSING APPARATUS, INFORMATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Tomohiko Shimoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 16/863,745

(22) Filed: Apr. 30, 2020

(65) Prior Publication Data

US 2020/0258257 A1    Aug. 13, 2020

Related U.S. Application Data

(63) Continuation of application No. PCT/JP2018/039874, filed on Oct. 26, 2018.

(30) Foreign Application Priority Data

Nov. 1, 2017   (JP) .............................. JP2017-212236

(51) Int. Cl.
| | | |
|---|---|---|
| H04N 5/232 | (2006.01) | |
| G06T 7/80 | (2017.01) | |
| G06T 7/73 | (2017.01) | |
| G06T 7/00 | (2017.01) | |
| H04N 5/247 | (2006.01) | |
| H04N 5/76 | (2006.01) | |

(52) U.S. Cl.
CPC .................. *G06T 7/80* (2017.01); *G06T 7/73* (2017.01); *G06T 7/97* (2017.01); *H04N 5/247* (2013.01); *H04N 5/76* (2013.01); *G06T 2207/10016* (2013.01); *G06T 2207/30204* (2013.01)

(58) Field of Classification Search
CPC ... B01L 9/52; B01L 2300/0654; G01N 15/06; G01N 33/487; G01N 2015/0065; G01N 2015/0693; G01N 15/10; G01N 21/84; G01N 33/48; G06T 7/0012; G06T 7/70; G06T 2207/10016; G06T 2207/30024; H04N 5/2253; H04N 5/2254; H04N 5/2256; A61B 2010/0003; A61B 10/0058; C12N 5/061; C12N 5/00; C12M 41/00
USPC ........................................................ 348/211.11
See application file for complete search history.

(56) References Cited

FOREIGN PATENT DOCUMENTS

| | | |
|---|---|---|
| JP | 2002-324239 A | 11/2002 |
| JP | 2004-235934 A | 8/2004 |
| JP | 2005-323046 A | 11/2005 |

(Continued)

*Primary Examiner* — Stephen P Coleman
(74) *Attorney, Agent, or Firm* — Canon U.S.A., Inc. IP Division (57) ABSTRACT

An information processing apparatus acquires a plurality of captured images captured by a plurality of image capturing devices, the plurality of captured images having imaging time codes that match each other, the plurality of captured images being used for generating a virtual viewpoint image, executes a detection process for detecting a predetermined image pattern on the plurality of captured images, and determines parameters on positions of the plurality of image capturing devices and orientations from the plurality of image capturing devices based on a result of the detection process for detecting the predetermined image pattern on the plurality of captured images having the imaging time codes that match each other.

14 Claims, 10 Drawing Sheets

(56) References Cited

FOREIGN PATENT DOCUMENTS

| | | | |
|---|---|---|---|
| JP | 2005-351883 | A | 12/2005 |
| JP | 2007-261463 | A | 10/2007 |
| JP | 2008-002980 | A | 1/2008 |
| JP | 2013-012045 | A | 1/2013 |
| JP | 2014-197802 | A | 10/2014 |
| JP | 2015-225529 | A | 12/2015 |

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2018/039874, filed Oct. 26, 2018, which claims the benefit of Japanese Patent Application No. 2017-212236, filed Nov. 1, 2017, both of which are hereby incorporated by reference herein in their entirety.

BACKGROUND

Field

The present disclosure relates to a process of estimating parameters, such as a position and an orientation, of a camera.

Background Art

To generate a virtual viewpoint video (also called free viewpoint video), parameters, such as positions and orientations, of multiple cameras need to be estimated with high accuracy. The parameters of each camera are generally estimated by using captured images of a marker placed in a common field of view range of the multiple cameras.

PTL 1 describes that a marker placed in a common field of view range is captured by multiple cameras and parameters, such as a position and an orientation, of each camera are estimated.

CITATION LIST

Patent Literature

PTL 1: Japanese Patent Laid-Open No. 2005-351883

To estimate the parameters of each camera with high accuracy, multiple cameras need to image a marker placed in the same spatial position. In addition, to estimate the parameters of each camera with high accuracy, not only images captured by the multiple cameras when a marker is present at a certain one position but also images captured by the multiple cameras when the marker is present at another position are also needed.

Therefore, for example, when the parameters of each camera are estimated by means of moving a marker in a common field of view range, images are captured in accordance with the following steps.

(1) Move a marker. (2) Confirm that the marker has stopped. (3) Image the marker with multiple cameras. (4) Confirm that imaging is complete and repeat from (1).

Even when two or more markers are used, step (1) to step (4) need to be repeated. In this way, the parameters of each camera have not been easily estimated so far.

SUMMARY

To solve the above problem, an information processing apparatus of the present disclosure has, for example, the following configuration. The information processing apparatus comprises: an acquisition unit configured to acquire a plurality of captured images captured by a plurality of image capturing devices, the plurality of captured images having imaging time codes that match each other, the plurality of captured images being used for generating a virtual viewpoint image; a detection unit configured to execute a detection process for detecting a predetermined image pattern on the plurality of captured images acquired by the acquisition unit; and a determination unit configured to determine parameters on positions of the plurality of image capturing devices and orientations from the plurality of image capturing devices based on a result of the detection process for detecting the predetermined image pattern by the detection unit on the plurality of captured images having the imaging time codes that match each other.

Further features of the present disclosure will become apparent from the following description of exemplary embodiments with reference to the attached drawings.

DESCRIPTION OF THE EMBODIMENTS

First Embodiment

A camera calibration system of a first embodiment will be described. In the present embodiment, an example in which the camera calibration system is applied to a camera system for generating a virtual viewpoint video will be mainly described. A virtual viewpoint video is generated based on multiple captured videos captured by multiple cameras and virtual viewpoints, virtual directions, and the like (virtual camera parameters). However, the camera calibration system of the present embodiment is not limited to the camera system for generating a virtual viewpoint video, and the camera calibration system of the present embodiment is applicable to various multicamera systems. In the present embodiment, it is assumed that a calibration process is a process on alignment of multiple cameras. In other words, the calibration process that is executed by the calibration apparatus 100 of the present embodiment includes a process of estimating parameters on the position, orientation, and the like, of each of multiple cameras. The calibration process also includes a process for associating the coordinate system of a captured image of each camera with a coordinate system common to the multiple cameras based on the parameters. However, the calibration apparatus 100 of the present embodiment may execute at least part of the calibration process and cause another apparatus to execute the remaining calibration process.

Hereinafter, an example in which multiple cameras are arranged in a stadium where sports, such as soccer, take place will be described; however, the configuration is not limited thereto. For example, other than sports, the present embodiment is also applicable to a case where multiple cameras are installed in, for example, a hall where concerts, performances, and the like, take place. In this way, multiple cameras may be installed in an event venue that accommodates multiple spectators.

Cameras may be installed in an event venue such that the position and imaging orientation are fixed or may be installed so that the imaging orientation is changeable by using a pan head, or the like. Alternatively, cameras may be installed so that the position of each camera can be changed. When the position and imaging orientation of each camera are changed, the calibration process may be executed in the changed position and imaging orientation, and the information may be held by a storage unit, such as a memory and a storage.

Figure 1:
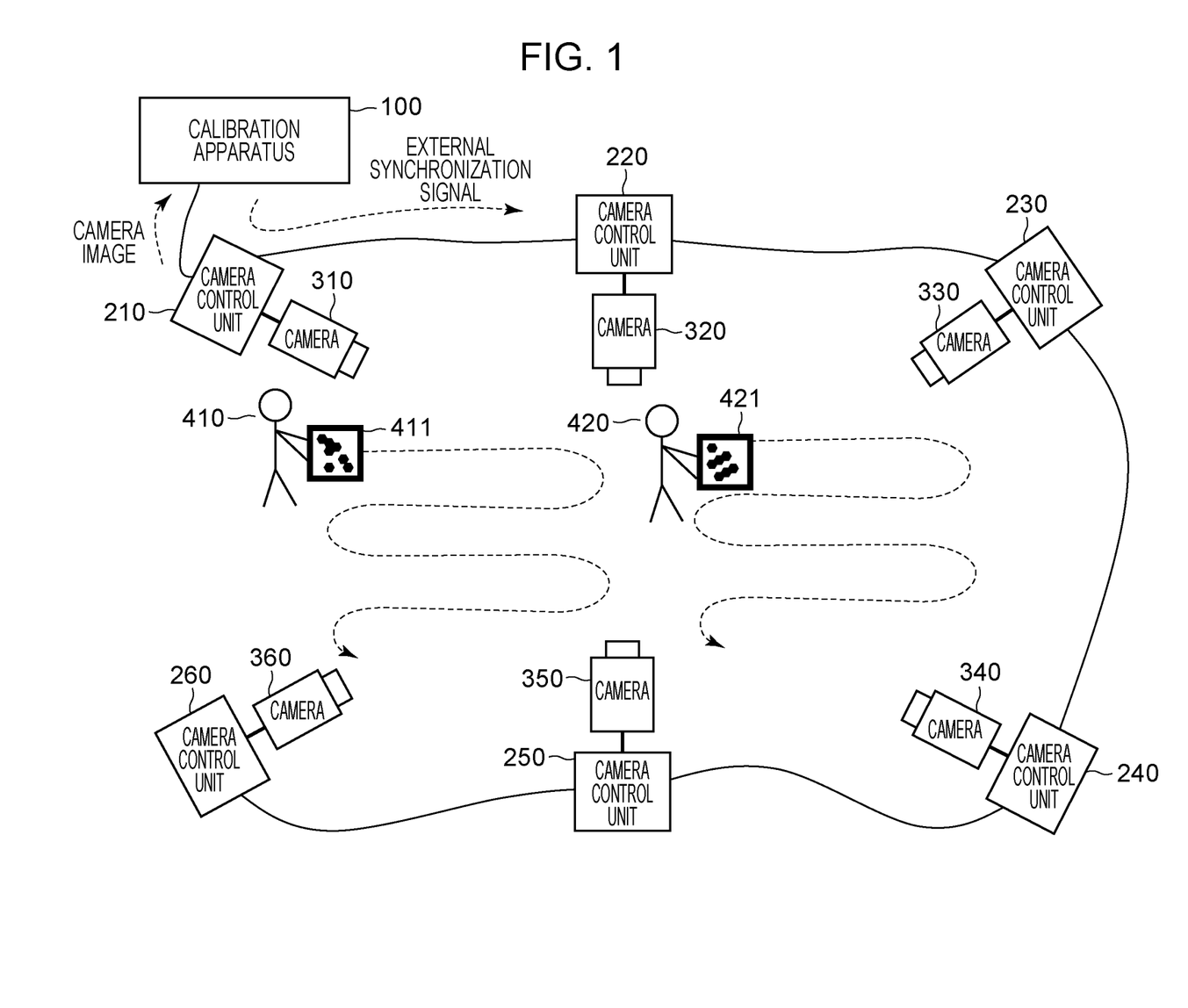
FIG. 1 is a diagram for illustrating the overall configuration of an embodiment.

FIG. 1 shows a system configuration of the first embodiment. In the present embodiment, beginning at the calibration apparatus 100, camera control units 210 to 260 are connected in a daisy chain connection. A connection topology is not limited to a daisy chain connection, and another network topology, such as star topology, may be employed.

Cameras 310 to 360 are respectively connected to the camera control units 210 to 260. In the present embodiment, the camera control units 210 to 260 are in a one-to-one correspondence with the cameras 310 to 360; however, the configuration is not limited thereto. For example, a single camera control unit may be associated with N cameras. In the present embodiment, each camera control unit and the associated camera are described as different devices; however, the function of the camera control unit may be incorporated in the camera.

The camera control units 210 to 260 each control an associated one of the cameras 310 to 360 based on an instruction that is sent from the calibration apparatus 100 through a network. The camera control units 210 to 260 each send a synchronization signal to an associated one of the cameras 310 to 360 based on a synchronization signal that is sent from the calibration apparatus 100.

The further detailed configurations of the calibration apparatus 100, camera control unit 210, and camera 310 will be described with reference to FIG. 2. The calibration apparatus 100 of the present embodiment includes a calibration calculation unit 101, an image acquisition unit 102, and a synchronous server 103. The camera control unit 210 includes an image sending unit 211, an image buffer 212, and a synchronous client 213. The camera control units 220 to 260 have similar configurations and functions to those of the camera control unit 210, and the cameras 320 to 360 have similar configurations and functions to those of the camera 310.

The synchronous server 103 and the synchronous client 213 synchronize with each other by using a synchronization signal (synchronization packet) that is sent through the network. In the present embodiment, PTP (Precision Time Protocol) is used as a synchronization protocol. However, synchronization may be performed by using another protocol.

In the present embodiment, the synchronous server 103 sends a synchronization signal to the synchronous client 213. The synchronous client 213 sends a genlock signal and a time code to the camera 310 in response to reception of the synchronization signal from the synchronous server 103. The camera 310 images at timing based on the genlock signal and sends an image signal obtained through the imaging and the time code sent from the synchronous client 213 to the image buffer 212. The image buffer 212 records the image signal and the time code sent from the camera 310.

Figure 3:
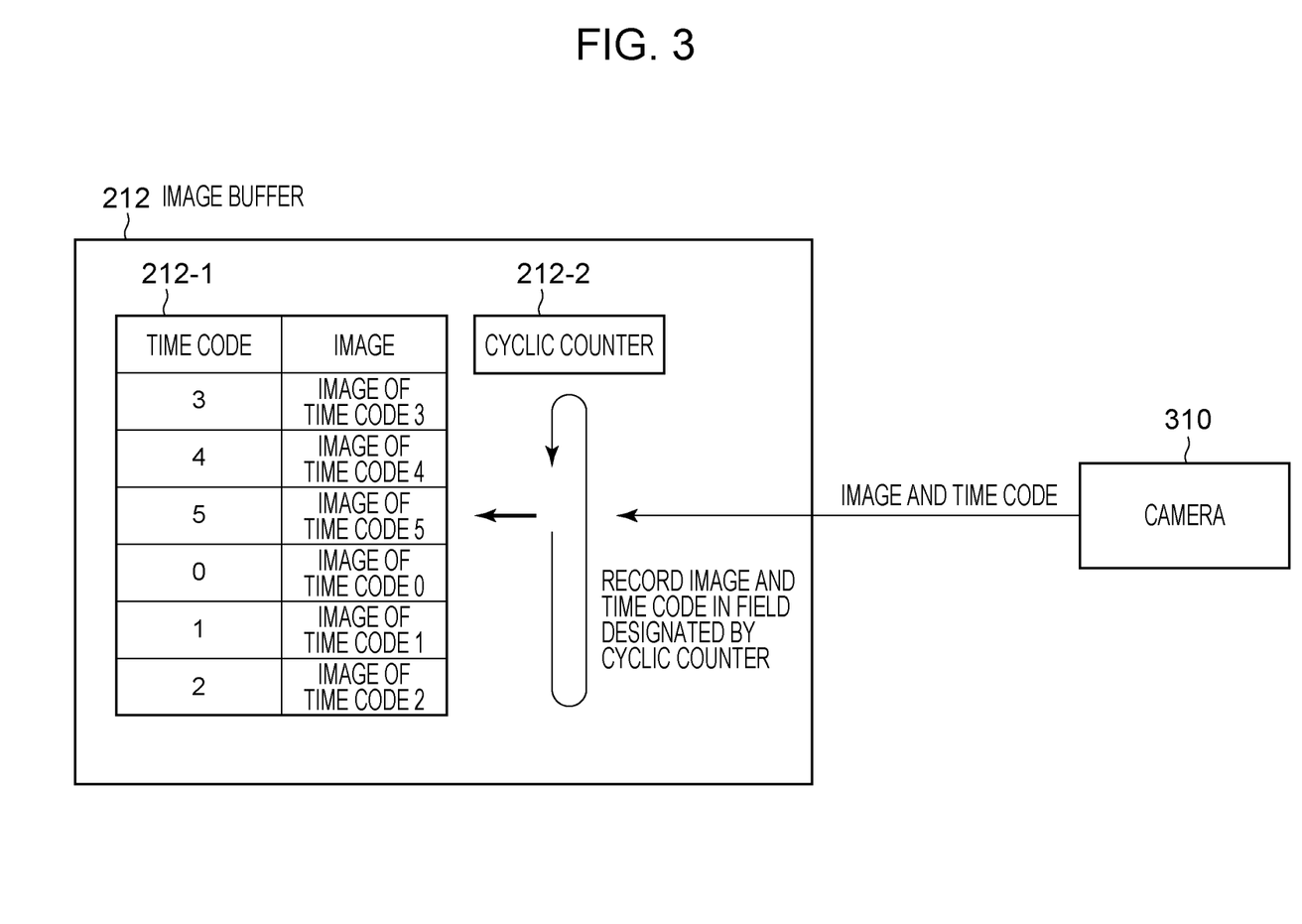
FIG. 3 is a diagram for illustrating an image buffer 212.

FIG. 3 shows the configuration of the image buffer 212. The image buffer 212 includes a buffer 212-1 and a cyclic counter 212-2. When the image buffer 212 receives an image signal and a time code from the camera 310, the image buffer 212 writes the information in a recording area indicated by the cyclic counter 212-2 in the buffer 212-1 and increments the cyclic counter 212-2 by one. When the recording areas of the buffer 212-1 are full, a new image signal is overwritten to the recording area associated with the oldest time code. Through the above operation, image signals and time codes taken in a last set period of time (which is determined based on the size of the buffer 212-1) are recorded in the image buffer 212. FIG. 3 shows an example in which the time code is a positive number that begins at 0 is described; however, the configuration is not limited thereto. Absolute time information that is acquired from a time server or an internal clock may be used as a time code.

The image sending unit 211, in response to a "request for images at time T" from the calibration apparatus 100, reads image signals associated with the time code "T" from the image buffer 212 and sends them to the calibration apparatus 100.

The calibration apparatus 100 calculates parameters of the cameras 310 to 360 by using captured images captured by the cameras 310 to 360. Parameters to be calculated by the calibration apparatus 100 include parameters (external parameters) on the position and orientation of each of the cameras 310 to 360. In addition to the parameters on the position and orientation of each of the cameras 310 to 360, parameters (internal parameters) on the focal length, lens distortion, and the like, of each camera may be calculated.

Figure 2:
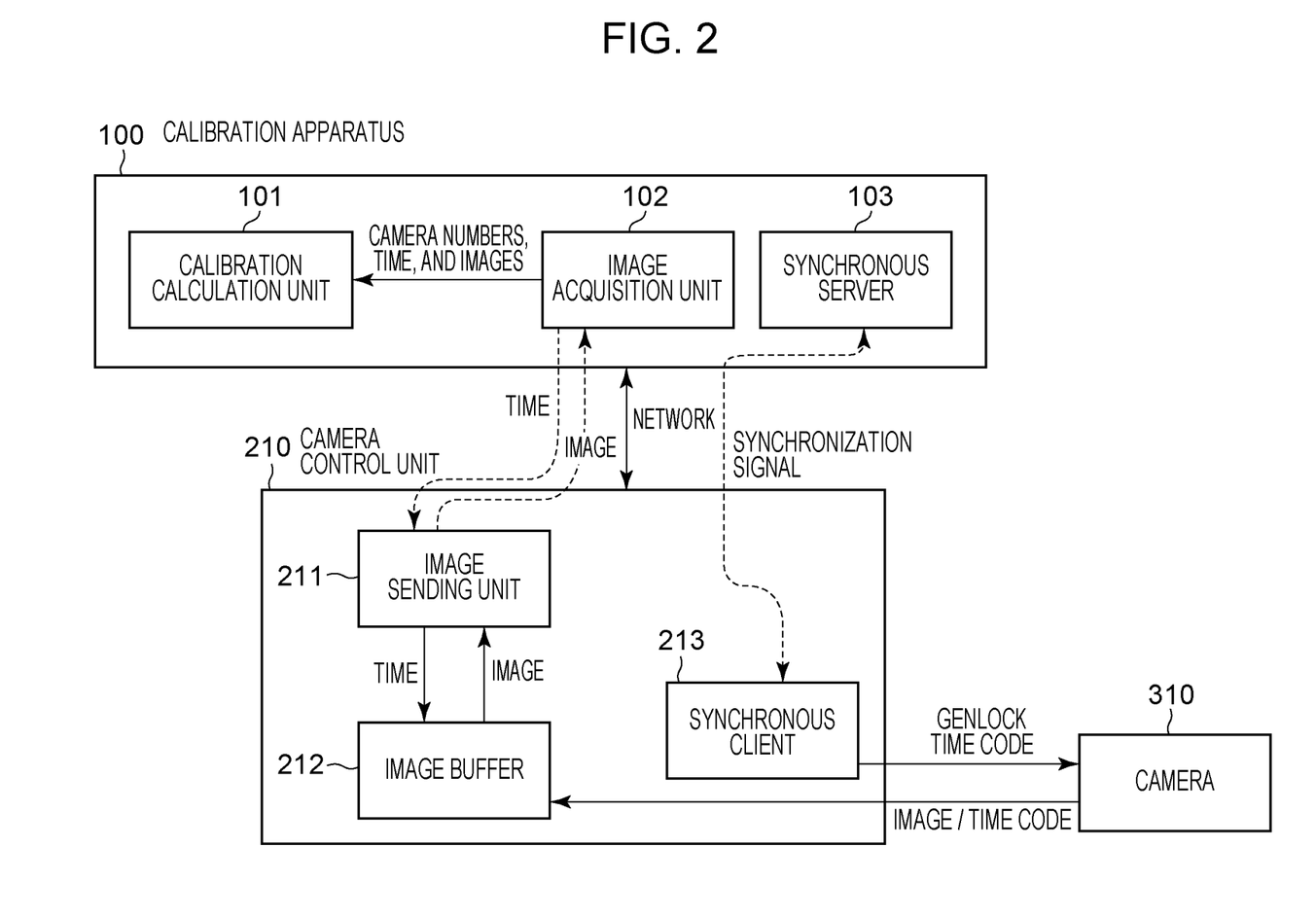
FIG. 2 is a diagram for illustrating the configuration of each device according to the embodiment.

In the present embodiment, an example in which each block illustrated in FIG. 2 is implemented by dedicated hardware will be mainly described. However, of the blocks, at least any one function may be implemented by software on one or multiple general-purpose processors (for example, CPUs).

Figure 4:
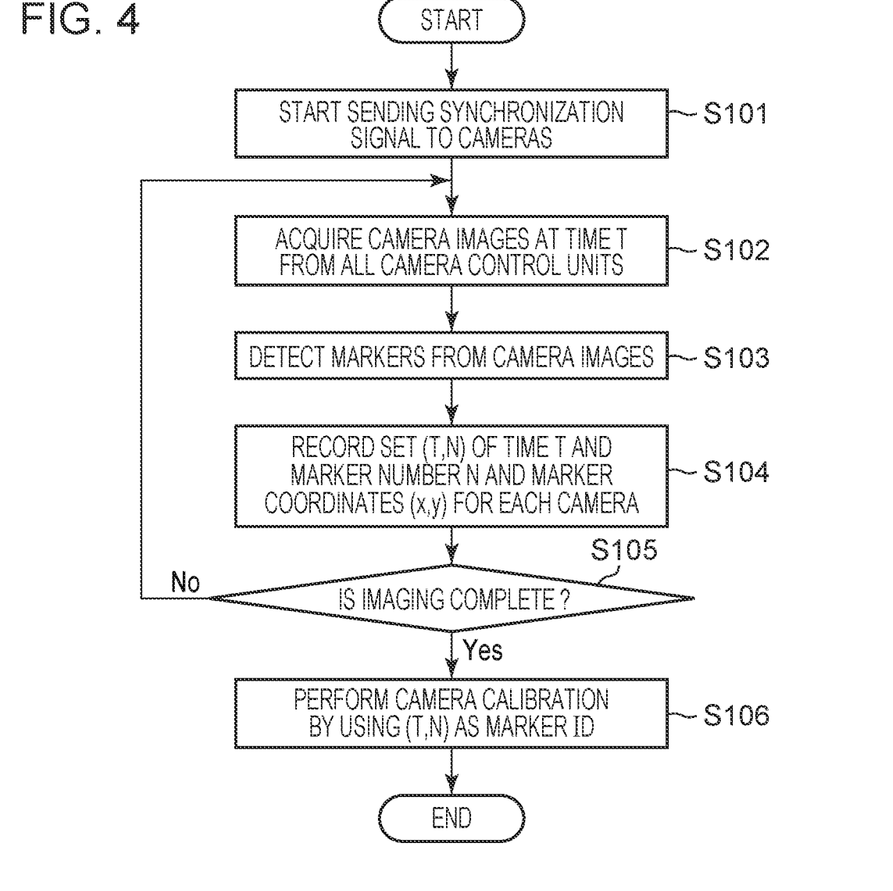
FIG. 4 is a flowchart that shows the operation of a calibration apparatus 100.

The operation of the calibration apparatus 100 will be described with reference to FIG. 4. The synchronous server 103 of the calibration apparatus 100 starts sending a synchronization signal to the synchronous clients 213 to 263 of the camera control units 210 to 260 (S101). The camera control units 210 to 260 cause the cameras 310 to 360 to image at timing based on the synchronization signal from the synchronous server 103. In other words, the cameras 310 to 360 start image capturing at the same timing. Captured images obtained as a result of image capturing by the cameras 310 to 360 are recorded in the image buffer 212 together with a time code.

The image acquisition unit 102 acquires multiple captured images having time codes that match each other from the camera control units 210 to 260 through the network and sends them to the calibration calculation unit 101 (S102). More specifically, the image acquisition unit 102 sends an image request designating a time code of time T to each of the camera control units 210 to 260. The image acquisition unit 102 acquires the captured images respectively captured by the cameras 310 to 360 at time T as a response to the image request.

The calibration calculation unit 101 executes a detection process for detecting a marker on each of the multiple captured images sent from the image acquisition unit 102 (S103). The marker is a predetermined image pattern. The calibration calculation unit 101 detects the predetermined image pattern from the captured images by using a known technique, such as pattern matching. As shown by a marker 411 and a marker 421 in FIG. 1, image patterns of multiple types are used as markers in the present embodiment. The calibration calculation unit 101 executes the process of detecting the image pattern of each type on each captured image.

When the calibration calculation unit 101 has detected a marker, the calibration calculation unit 101 records a set (T,N) of time T and a marker identifier N and marker coordinates (x,y) for each camera (S104). In other words, the calibration calculation unit 101 records time T, a marker identifier, and position information of the marker in a captured image in association with one another. The above-described S102 to S104 are repeated until an imaging end instruction is input (S105).

When an imaging end instruction is input (Yes in S105), the calibration calculation unit 101 executes a calibration process by using the set of (T,N) as a marker ID (S106). In the present embodiment, it is assumed that the position of each marker can change time by time, so the marker identifier N cannot be directly used as a marker ID. In other words, even when marker coordinates are associated with the same identifier N, the calibration process is not successful unless the marker coordinates are associated with the same time. On the other hand, when multiple sets of marker coordinates of which a set of time T and identifier N is the same are used, the calibration process is performed correctly.

The calibration calculation unit 101 of the present embodiment executes the calibration process by using a set of (T,N) as a marker ID. As described above, the calibration process of the present embodiment is a process on alignment of multiple cameras. The calibration process includes a process of estimating parameters on the position, orientation, and the like, of each of the multiple cameras and a process for associating the coordinate system of a captured image of each camera with a coordinate system common to the multiple cameras based on the parameters. A specific method of executing the calibration process based on the position of a marker, detected from a captured image, is described in PTL 1, or the like, so the description is omitted.

Figure 5:
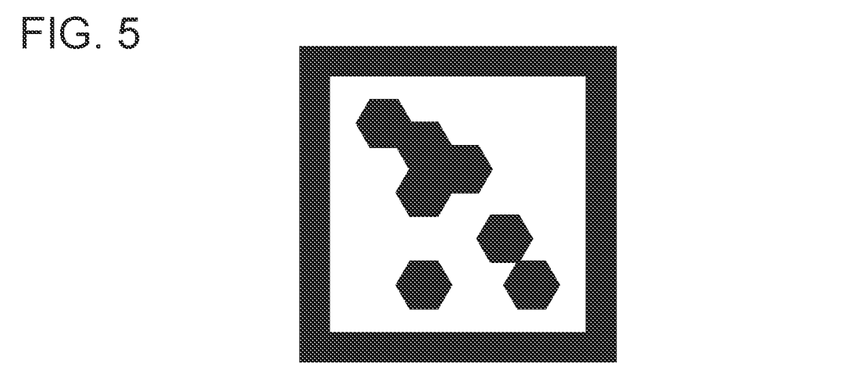
FIG. 5 is a view for illustrating a marker 411.

The marker holders 410 to 440 (only 410 to 420 are shown in FIG. 1) hold markers and walk in a common field of view range among the cameras 310 to 360 while holding the markers 411 to 441. Each of the markers 411 to 441 has a different image pattern. It is assumed that pieces of information about different marker identifiers N are respectively embedded in the image patterns of the markers 411 to 441. The calibration calculation unit 101 is able to read the marker identifier N by executing image processing on a captured image. An example of the image pattern of the marker 411 is shown in FIG. 5. In the present embodiment, it is assumed that a marker holder walks while holding a flat plate with a special pattern printed on each side.

Figure 6:
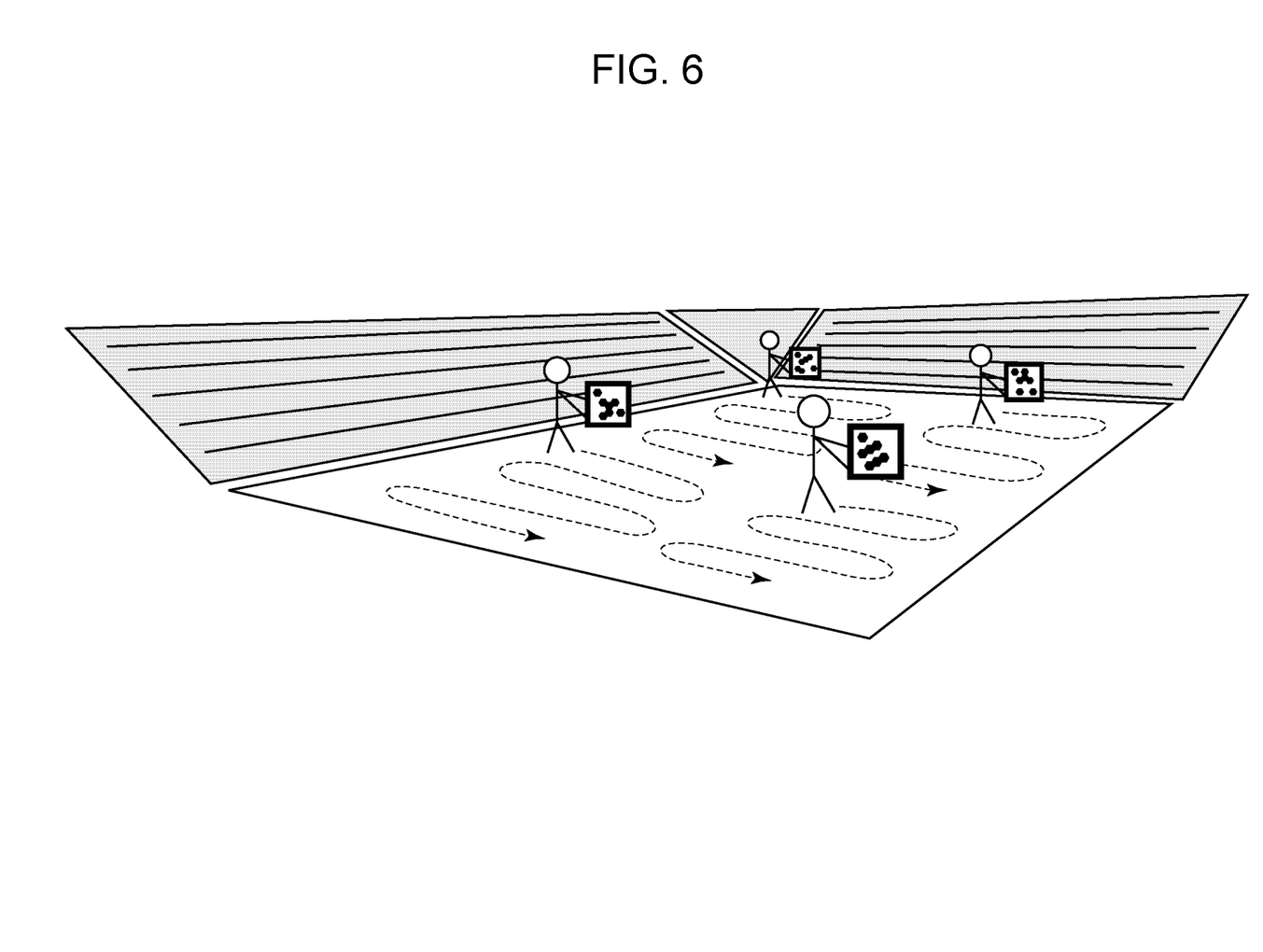
FIG. 6 is a view that shows how marker holders 410 to 440 move.

A manner of walking in a soccer (football) ground will be described in detail with reference to FIG. 6 as a further specific manner in which the marker holders 410 to 440 walk. FIG. 6 shows that a soccer ground is divided into four regions and how the marker holders 410 to 440 walk all around in an associated region.

Although a soccer ground is described as an example, the present embodiment is not limited to a soccer ground, fields for other sports may be employed. Examples include fields of rugby and American football, athletic fields for athletic sports, and competition halls for judo, kendo, and the like. There may be halls where concerts, performances, and the like, take place.

Figure 7:
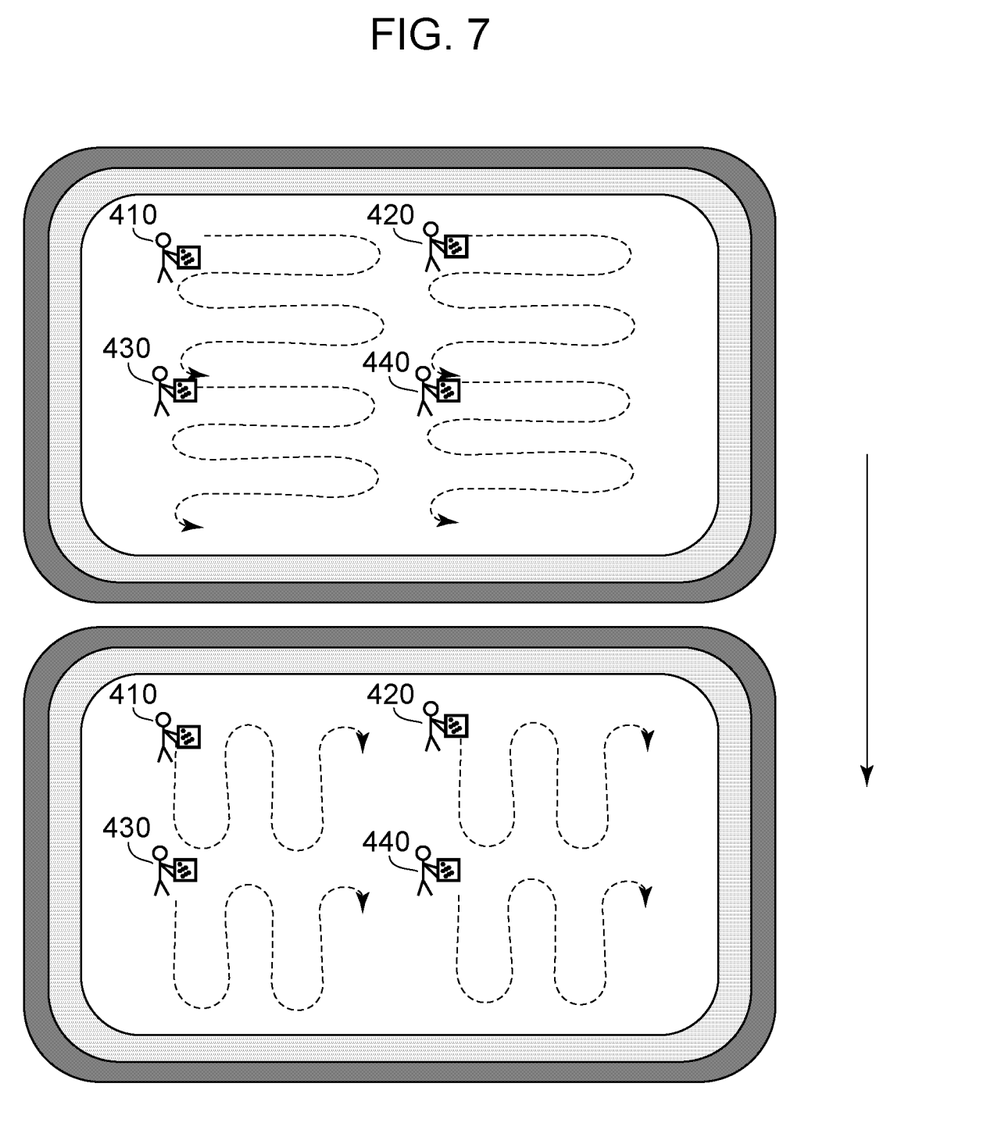
FIG. 7 is a view that shows the order in which the marker holders 410 to 440 move.

In the present embodiment, it is assumed that the marker holders 410 to 440 walk in a cross direction of a soccer ground first and then walk in a longitudinal direction as shown in FIG. 7. This is because of the following reasons. In the present embodiment, since the markers 411 to 441 are flat, the markers 411 to 441 are detected from captured images of the cameras that capture the markers from the front or from the rear. On the other hand, the markers 411 to 441 are not detected from captured images of the cameras 310 to 360 that capture the markers 411 to 441 from the cross sides. Thus, when the marker holders 410 to 440 walk while changing direction, the markers 411 to 441 appear in images captured by the cameras 310 to 360 in any one of the longitudinal direction and the cross direction. In the present embodiment, the marker holders 410 to 440 may walk in a soccer stadium in the longitudinal direction and then walk in the cross direction.

In the present embodiment, moving ranges of the marker holders 410 to 440 overlap each other. Thus, regions where no marker is detected do not occur.

As described above, the calibration apparatus 100 (information processing apparatus) of the present embodiment acquires respective captured images (captured images associated with the same time code) of the multiple cameras 310 to 360. Then, the calibration apparatus 100 executes the detection process for detecting the predetermined image patterns (markers) from the multiple captured images and executes the calibration process for each of the cameras 310 to 360 by using the detection results. The calibration process includes a process of estimating the parameters on the position and orientation of each camera and a process for associating the coordinate system of the captured image of each camera with the coordinate system common to the multiple cameras. The calibration apparatus 100 does not always need to execute all the above-described processes and may cause another apparatus to execute part of the calibration process. With the system of the present embodiment, a highly accurate calibration process is possible by using a relatively smaller number of markers.

Second Embodiment

Next, a second embodiment will be described with a focus on the difference from the first embodiment. In the second embodiment, an example in which moving markers are captured by multiple synchronized cameras as moving images and a calibration process is executed by extracting captured images of the same time from the moving images will be described.

A system configuration of the present embodiment is as shown in FIG. 1. The configurations of the calibration apparatus 100, camera control units 210 to 260, and cameras 310 to 360 are basically as described with reference to FIG. 2. However, the camera control units 210 to 260 of the present embodiment each include a recording unit for recording a moving image.

The camera control units 210 to 260 cause the cameras 310 to 360 to synchronously capture and record captured images by the cameras 310 to 360 based on an instruction from the calibration apparatus 100, which is sent through the network.

While the marker holders 410 to 440 (in FIG. 1, only 410 and 420 are shown) walk around in the field of view range common to the cameras 310 to 360, the calibration apparatus 100 issues an instruction such that the camera control units 210 to 260 record the marker holders 410 to 440 walking around as a moving image. In other words, the calibration apparatus 100 of the present embodiment sends an instruction on a recording of a moving image to the multiple camera control units 210 to 260.

After the cameras 310 to 360 complete capturing of moving images, the calibration apparatus 100 acquires multiple images having time codes that match each other (that is, captured at the same time) from among multiple images that constitute the respective captured moving images of the cameras 310 to 360.

Figure 8:
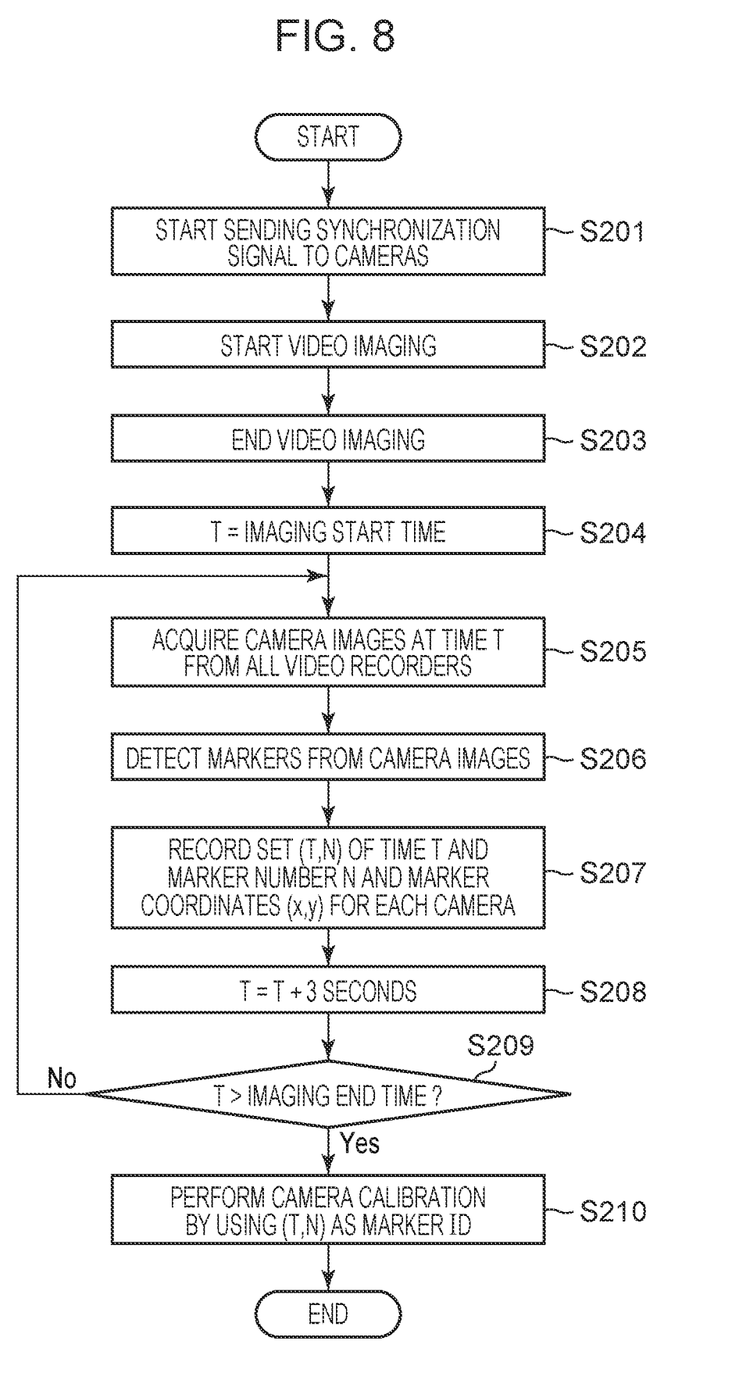
FIG. 8 is a flowchart that shows the operation of the calibration apparatus 100.

The operation of the calibration apparatus 100 of the present embodiment will be described in detail with reference to the flowchart of FIG. 8. The synchronous server 103 of the calibration apparatus 100 starts sending a synchronization signal to the synchronous clients 213 to 263 of the camera control units 210 to 260 (S201). The camera control units 210 to 260 cause the cameras 310 to 360 to capture at timing based on the synchronization signal from the synchronous server 103. In other words, the cameras 310 to 360 start image capturing at the same timing.

Subsequently, the synchronous server 103 of the calibration apparatus 100 instructs the camera control units 210 to 260 to start recording a moving image. Thus, how the marker holders 410 to 440 move in a soccer ground is recorded (S202). When the synchronous server 103 of the calibration apparatus 100 has recorded a sufficient moving image for the calibration process, the synchronous server 103 instructs the camera control units 210 to 260 to stop recording (S203).

The image acquisition unit 102 sets time T as a imaging start time (S204), and sends an image request designating time T to the camera control units 210 to 250 (S205). The calibration calculation unit 101 executes the detection process for detecting a marker on the captured images at time T, acquired in S205 (S206). When a marker has been detected, the calibration calculation unit 101 records a set (T,N) of time T and a marker identifier N and marker coordinates (x,y) for each camera (S207). Then, time T is advanced three seconds (S208), and the process returns to S205 when time T has not reached the imaging end time.

A time that is added in S208 is not limited to three seconds. In the present embodiment, it is assumed that a captured image per three seconds is required in a imaging period of 300 seconds (five minutes). Seconds to be added in S208 can vary depending on the area of a field, the number of marker holders, and the like.

When it is estimated that time T has reached the imaging end time (Yes in S209), the synchronous server 103 sends an instruction to end recording to the synchronous clients 213 of the camera control units 210 to 260. The calibration calculation unit 101 executes the calibration process by using a set (T,N) of time T and marker identifier N as a marker ID (S210).

With the system of the present embodiment as well, as in the case of the first embodiment, a highly accurate calibration process is possible by using a relatively smaller number of markers.

Third Embodiment

Next, a third embodiment will be described with a focus on the difference from the first embodiment. In the third embodiment, an example in which markers are projected by a projector, multiple synchronized cameras capture the markers, and the calibration process is executed by using the captured images will be described.

Figure 9:
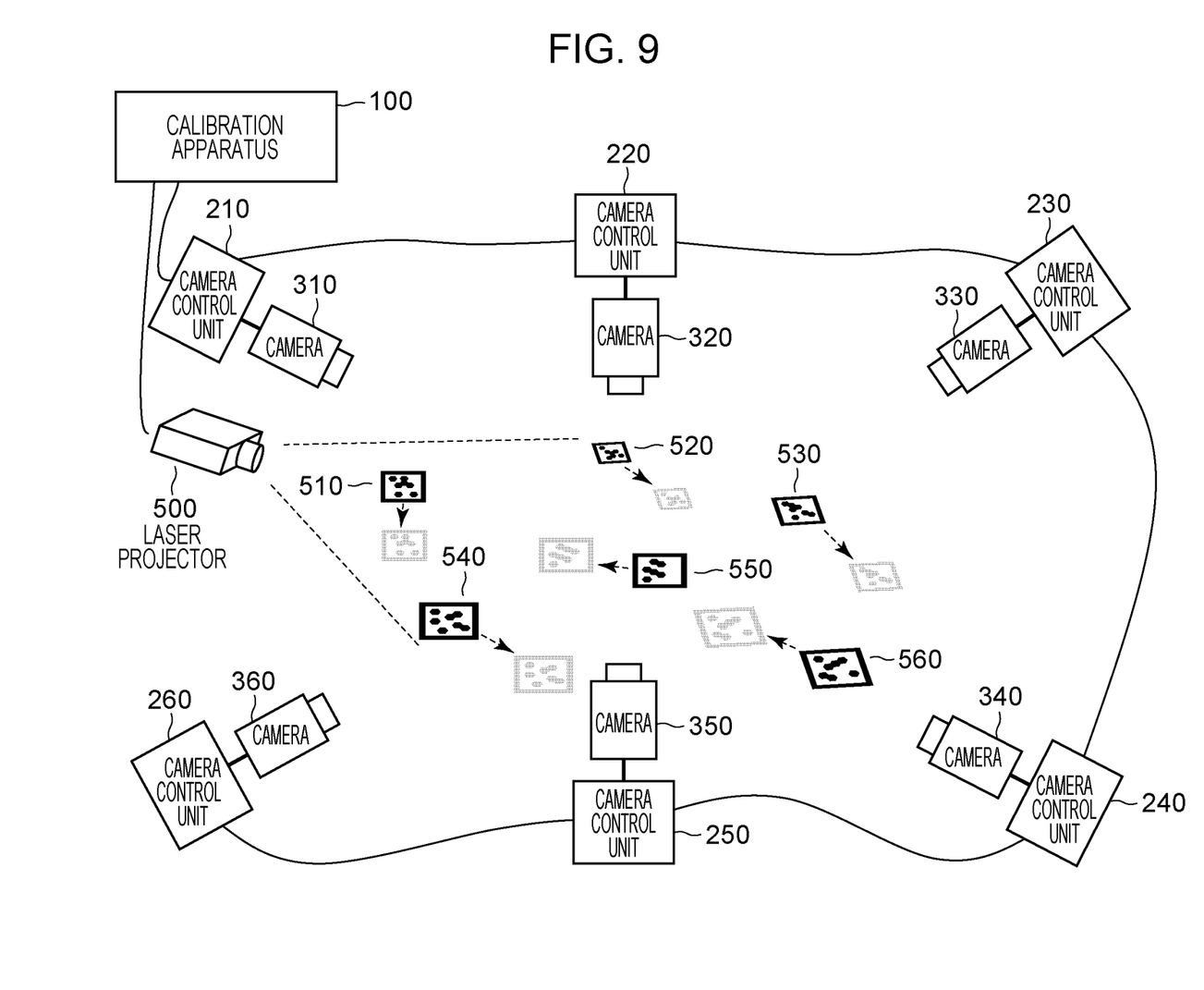
FIG. 9 is a diagram for illustrating the overall configuration of an embodiment.

FIG. 9 shows a system configuration of the present embodiment. In the present embodiment, instead of the marker holders 410 to 440 walking in a field, markers 510 to 560 are projected by a laser projector 500 on the field. The calibration apparatus 100 executes the calibration process by acquiring multiple images captured at the same time from the camera control units 210 to 260 each time the laser projector 500 projects markers to new positions.

Figure 10:
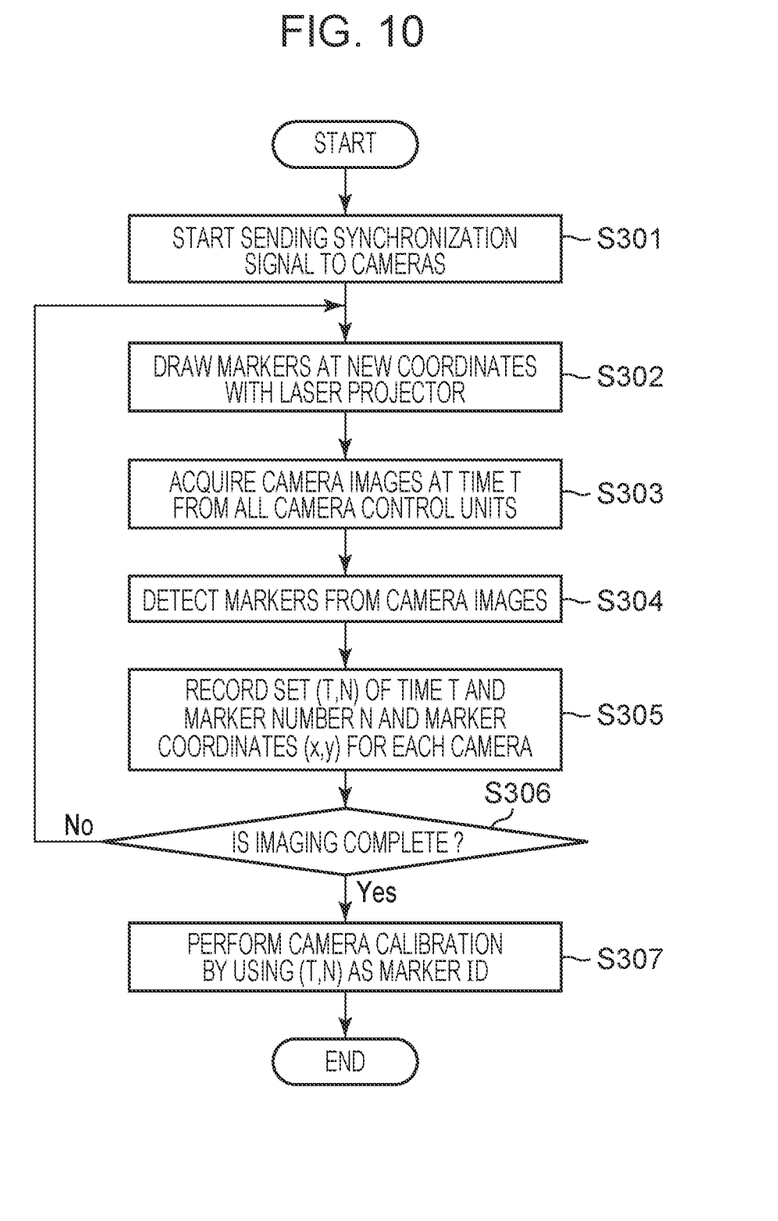
FIG. 10 is a flowchart that shows the operation of the calibration apparatus 100.

The operation of the calibration apparatus 100 of the present embodiment will be described with reference to the flowchart of FIG. 10. S301, and S303 to S307 in FIG. 10 respectively correspond to S101 to S106 in FIG. 4. A characteristic step of the present embodiment is S302. In other words, the calibration apparatus 100 controls the laser projector 500 and projects the markers 510 to 560 at new positions (S302). The image acquisition unit 102 acquires captured images captured at the same time from the cameras 310 to 360 each time the laser projector 500 projects markers at new positions (S302 to S305). In the present embodiment, an example in which the calibration apparatus 100 controls projection of the laser projector 500 is described; however another apparatus may control the laser projector 500.

The laser projector 500 projects images by scanning laser, so it is difficult for the laser projector 500 to project a large number of markers at the same time. In the present embodiment, by repeating a process of imaging each time marker projection positions are changed, a highly accurate calibration process is possible with a relatively smaller number of markers.

In the present embodiment, an example in which imaging is performed each time marker projection positions are changed is mainly described. Alternatively, as in the case of the second embodiment, even when the cameras 310 to 360 capture moving images and the calibration process is executed by using the moving images, similar advantageous effects are obtained.

In the present embodiment, markers are drawn by the laser projector 500. Alternatively, even when patterns that allow finding of the same point in captured images through matching of a feature vector, instead of markers, the calibration process is executable.

As described above, even when only a small number of markers can be projected by a laser projector, markers are captured by synchronized cameras multiple times at different marker positions, the camera calibration process is accurately executed as in the case where a large number of markers is projected.

Fourth Embodiment

Next, a fourth embodiment will be described with a focus on the difference from the first embodiment. In the fourth embodiment, an example in which markers are moved by flying objects (for example, drones), the markers are captured by multiple synchronized cameras, and the calibration process is executed by using the captured images will be described.

Figure 11:
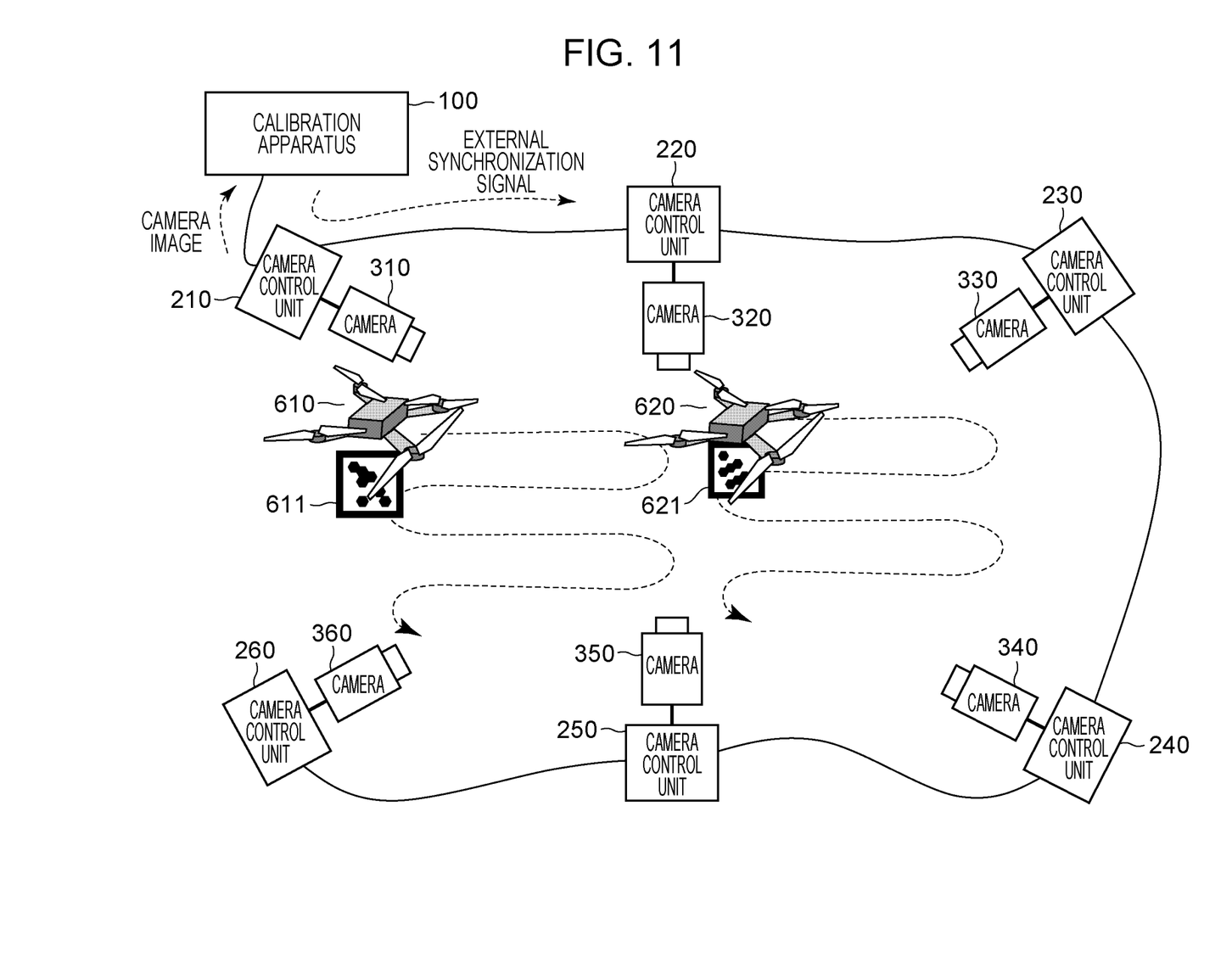
FIG. 11 is a diagram for illustrating the overall configuration of an embodiment.

FIG. 11 shows a system configuration of the present embodiment. In the present embodiment, instead of the marker holders 410 to 440 walking in a field, the calibration apparatus 100 controls the flight of drones 610 to 620. The drones 610, 620 respectively have markers 611, 621, and the cameras 310 to 360 capture them. Instead of the calibration apparatus 100, another apparatus may control the movements of the drones 610 to 620.

In the present embodiment, an example in which the markers 611, 621 attached to the drones 610, 620 are captured is described. Alternatively, the calibration process may be executed based on a feature vector of an image of each drone body.

Through the above process, even when only a small number of drones can be used, the calibration process with a similar accuracy to that when a large number of drones are used can be executed by imaging with the synchronized cameras multiple times at different drone positions.

According to the present disclosure, the parameters of each camera are further easily estimated.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. An information processing apparatus comprising:
one or more memories storing instructions; and
one or more processors executing the instructions to:
acquire a plurality of captured images captured by a plurality of image capturing devices, the plurality of captured images having time codes that match each other, the plurality of image capturing device being used for generating a virtual viewpoint image;
execute a detection process for detecting a predetermined image pattern on the plurality of captured images; and
determine parameters on positions of the plurality of image capturing devices and orientations from the plurality of image capturing devices based on a result of the detection process for detecting the predetermined image pattern on the plurality of captured images having the time codes that match each other.

2. The information processing apparatus according to claim 1, wherein the plurality of captured images are acquired by the plurality of image capturing devices imaging a predetermined image pattern that temporally changes in position.

3. The information processing apparatus according to claim 1, wherein
a plurality of types of predetermined image patterns are detected, and
the parameters are determined based on information that associates the time codes with an identifier indicating a type of a detected predetermined image pattern.

4. The information processing apparatus according to claim 1, wherein
a plurality of types of predetermined image patterns are detected, and
the parameters are determined by using position information of a detected image pattern in the plurality of captured images of which the time codes and identifiers indicating a type of the image pattern respectively match.

5. The information processing apparatus according to claim 1, wherein, after the plurality of image capturing devices complete imaging a moving image, a plurality of images of which the time codes match each other are acquired from among a plurality of images that constitute captured moving images of the plurality of image capturing devices.

6. The information processing apparatus according to claim 1, wherein the one or more processors further execute the instructions cause a projector to project the predetermined image pattern.

7. The information processing apparatus according to claim 1, wherein the one or more processors further execute the instructions to control a movement of a flying object having the predetermined image pattern.

8. The information processing apparatus according to claim 1, wherein the predetermined image pattern is a calibration marker.

9. The information processing apparatus according to claim 1, wherein the one or more processors further execute the instructions to determine parameters on a focal length and lens distortion of each of the plurality of image capturing devices by using the result of the detection process for detecting the predetermined image pattern.

10. The information processing apparatus according to claim 1, wherein the plurality of image capturing devices are installed in an event venue that accommodates spectators.

11. The information processing apparatus according to claim 1, wherein the plurality of captured images are acquired by sending an image request designating a time code to control units each configured to record a captured image of an associated one of the plurality of image capturing devices.

12. The information processing apparatus according to claim 11, wherein the plurality of image capturing devices are in a one-to-one correspondence with control devices.

13. An information processing method comprising:
acquiring a plurality of captured images captured by a plurality of image capturing devices, the plurality of captured images having time codes that match each other, the plurality of image capturing devices being used for generating a virtual viewpoint image;

executing a detection process for detecting a predetermined image pattern on the acquired plurality of captured images; and determining parameters on positions of the plurality of image capturing devices and orientations from the plurality of image capturing devices based on a result of the detection process for detecting the predetermined image pattern on the plurality of captured images having the time codes that match each other.

14. A non-transitory computer-readable storage medium storing a computer program for causing a computer to execute an information processing method comprising:

acquiring a plurality of captured images captured by a plurality of image capturing devices, the plurality of captured images having time codes that match each other, the plurality of image capturing devices being used for generating a virtual viewpoint image;

executing a detection process for detecting a predetermined image pattern on the acquired plurality of captured images; and determining parameters on positions of the plurality of image capturing devices and orientations from the plurality of image capturing devices based on a result of the detection process for detecting the predetermined image pattern on the plurality of captured images having the time codes that match each other.

* * * * *